H. W. PAULUS.
APPARATUS FOR USE IN EFFECTING CHEMICAL REACTIONS.
APPLICATION FILED JULY 26, 1920.
1,420,210.
Patented June 20, 1922.
3 SHEETS—SHEET 1.
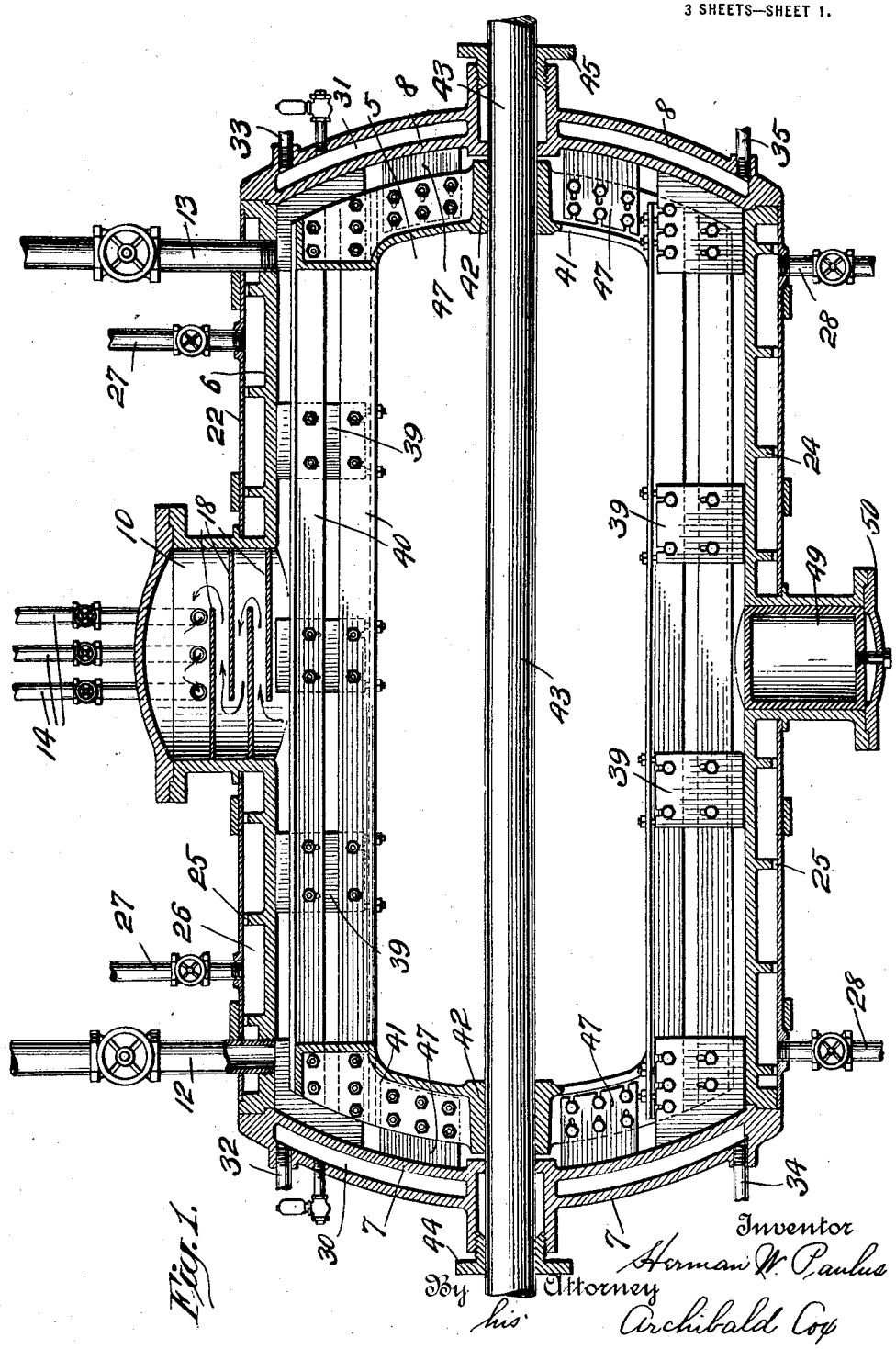

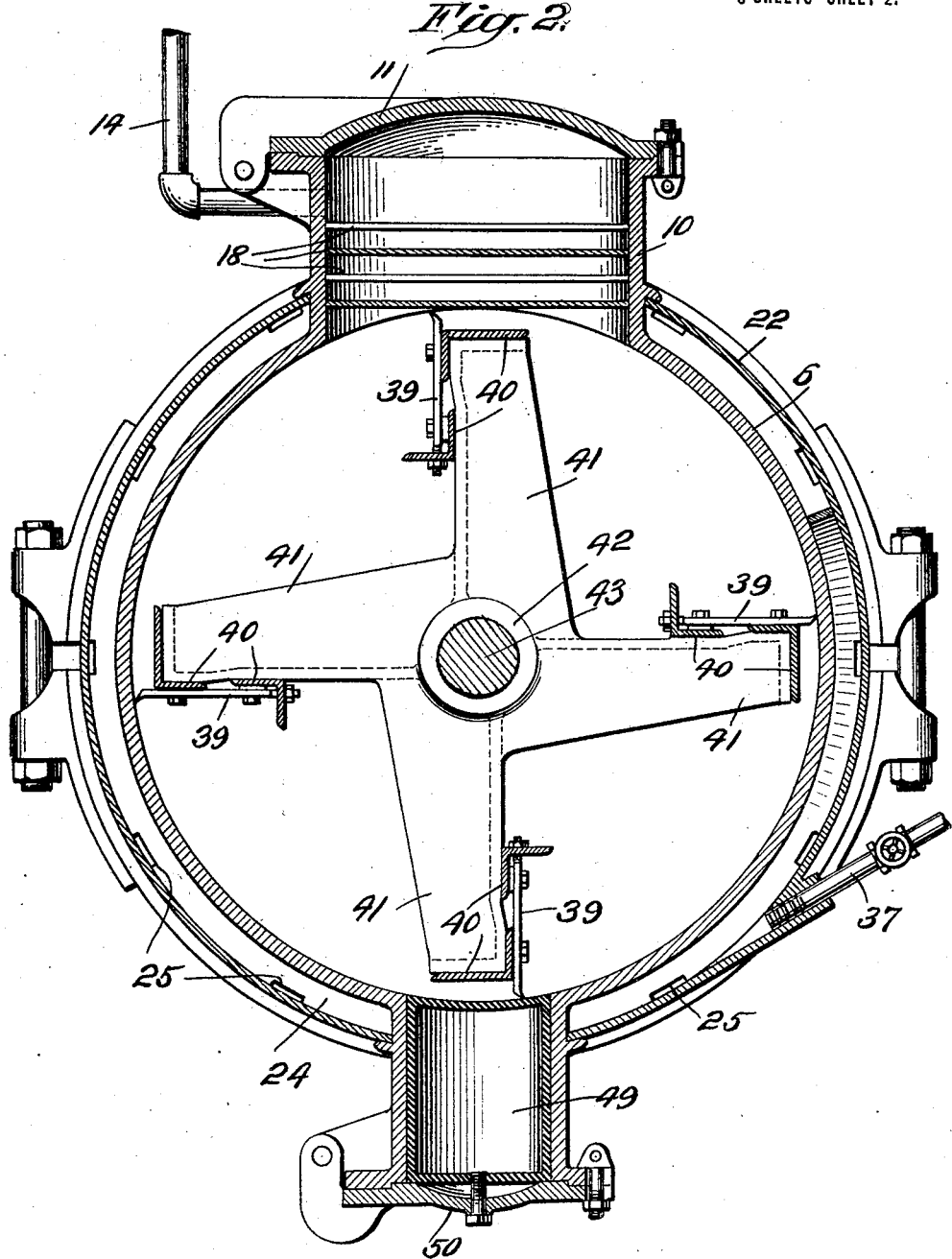

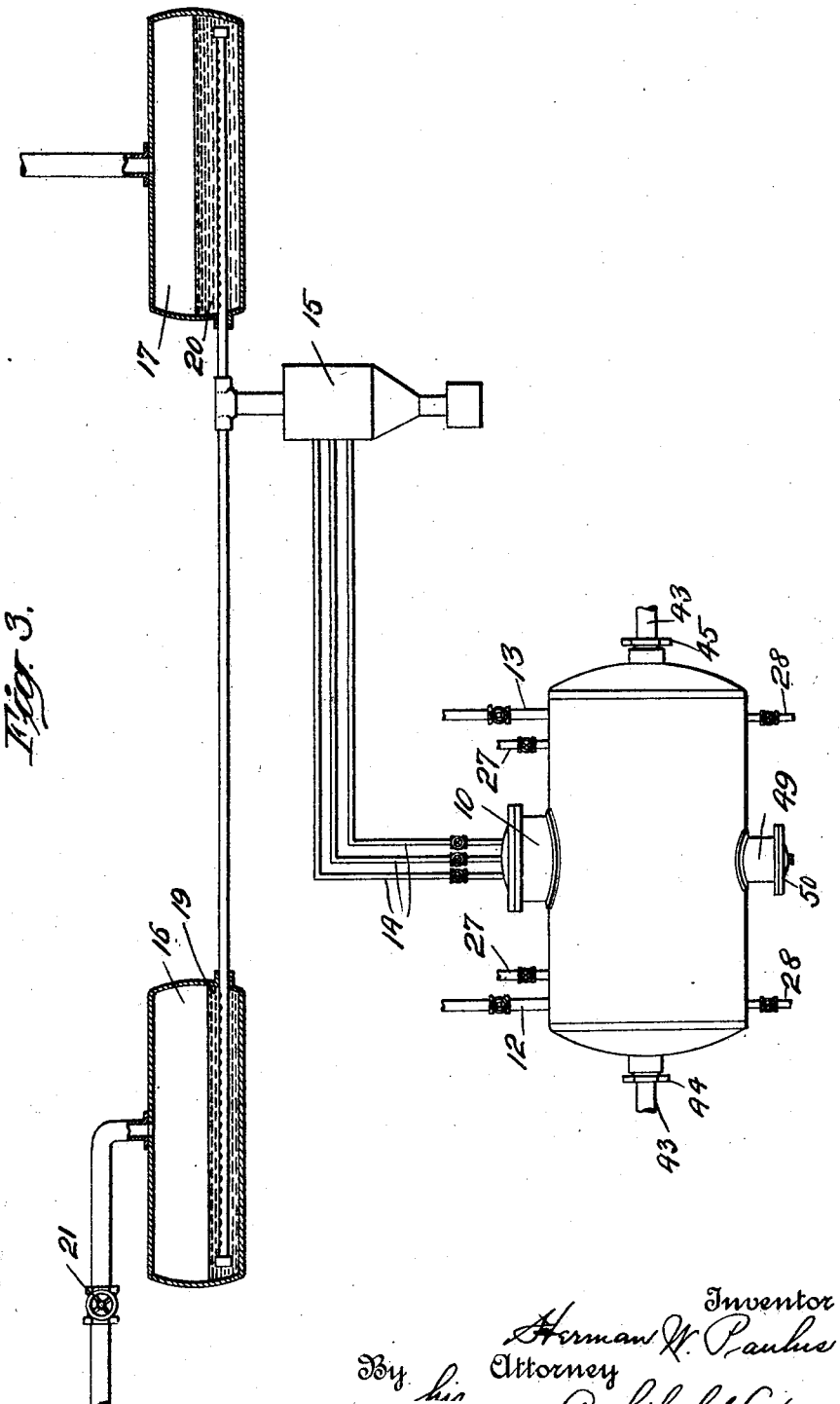

UNITED STATES PATENT OFFICE.

HERMAN W. PAULUS, OF RICHMOND HILL, NEW YORK, ASSIGNOR TO ROYAL BAKING POWDER COMPANY, A CORPORATION OF NEW JERSEY.

APPARATUS FOR USE IN EFFECTING CHEMICAL REACTIONS.

1,420,210.   Specification of Letters Patent.   Patented June 20, 1922.

Application filed July 26, 1920. Serial No. 399,082.

*To all whom it may concern:*

Be it known that I, HERMAN W. PAULUS, a citizen of the United States, and a resident of Richmond Hill, Long Island, in the county of Queens and State of New York, have invented certain new and useful Improvements in Apparatus for Use in Effecting Chemical Reactions, of which the following is a specification.

The invention relates to an apparatus for use in effecting chemical reactions, and more particularly, the invention relates to an apparatus for use in effecting chemical reactions in which it is necessary to form the compound under pressure and by means of heat, all the while stirring the compound to effect the intimate contact of all the particles with each other.

The apparatus of the invention may be put to a wide variety of uses in effecting chemical reactions of the above indicated nature. For the purposes of illustration, and description, the invention will be described with relation to the production of sodium formate, although it will be understood that the invention is by no means to be restricted to an apparatus particularly adapted for this purpose, inasmuch as the apparatus of the invention is equally well adapted for use in producing other compounds in which it is necessary to follow a more or less similar course of steps and reactions. The object of the invention is to reorganize and improve the construction and arrangement of the parts of an apparatus for use in effecting chemical reactions in which the apparatus is subjected to great stresses, due to the heat and pressure under which the chemical reactions take place in order that such apparatus may perform its functions more effectively and economically than with the apparatus at present employed for such purposes. To this end the invention consists in the improved apparatus hereinafter described and particularly pointed out in the appended claims.

The preferred form of the invention is illustrated in the accompanying drawings in which Fig. 1 is a longitudinal section through the improved apparatus; Fig. 2 is a transverse section through the apparatus, and Fig. 3 is a diagrammatic representation of the apparatus in connection with accessory parts for assisting in carrying out the process performed in the apparatus.

The improved apparatus for use in effecting chemical reactions, as illustrated in the accompanying drawings, comprises a receptacle or chamber 5 in which the chemical process is effected. This chamber 5 constitutes the interior of a cylindrical tank or drum 6. The drum 6 must be of some material sufficiently strong to withstand the great stresses to which it is subjected during the chemical reactions taking place in the chamber 5. It has been found that a carefully made steel casting is adapted for the purpose. The open ends of the steel cylinder 6 are closed by steel heads 7 and 8. These heads are preferably made dished the better to withstand the stresses to which they are subjected.

For the sake of illustration it is assumed that the sodium formate produced in the apparatus of the invention is made according to the principles of the Hempel process. The caustic soda in pulverized form is placed in the reaction chamber 5 and then the carbon monoxide is introduced under a pressure varying from 125 to 150 pounds. The caustic soda is introduced into the chamber 5 through the manhole or dome 10 situated at the top of the drum. A hinged cover 11 is used to close the dome. The carbon monoxide may be contained in what is known as producer gas which has been carefully scrubbed and dehydrated so as to eliminate all objectionable substances and entrained water. The gas introduced into the reaction chamber 5 will now consist of about 25% of carbon monoxide together with hydrogen and nitrogen. After these gases have passed through the reaction chamber, the mixture of hydrogen, nitrogen and the remaining carbon monoxide which has not been taken up by the caustic soda may be used for heating purposes. The carbon monoxide with its accompanying gases is introduced into the reaction chamber through the valve-controlled pipes 12 and 13. The waste gases leave the reaction chamber through the relatively small pipes 14 which enter the drum through the dome 10. These discharge pipes 14 are made relatively small to give the escaping gases sufficient velocity for cleaning the pipes. To avoid unnecessary noise made by the escaping gases, and prevent the loss of suspended particles the pipes 14 discharge into a dust collector 15 and thence into water seals in the tanks 16 and 17. The water in the tank 16 is kept at such a level that the gases passing through it are kept at a pressure requisite for combustion purposes. The water in the tank 17 acts as an automatic relief to the atmosphere in case the valve 21 is closed. The waste gases first travel past a series of baffle plates 18 arranged in the dome 10 to catch as much of the escaping caustic soda and sodium formate as possible and then they pass through the dust collector 15 to remove still more of the particles of the formate contained in the gases and finally they pass through the water seals 19 and 20 contained within the tanks 16 and 17. These water seals act to prevent the propagation of a flame back through the pipes into the drum.

The reaction between the caustic soda and carbon monoxide in producing the sodium formate sets in at about 125 pounds pressure and at a temperature of about 130° C., depending somewhat on the percentage of carbon monoxide in the producer gas. Care must be exercised that the temperature does not rise above 175° C., otherwise the resulting material will be sodium carbonate. Consequently in order to secure the desired results, it is necessary to raise the temperature of the apparatus to 130° C. at the beginning of the operation, and then when the operation has proceeded for some time, during which the temperature of the apparatus is gradually rising due to the exothermic reaction taking place in the reaction chamber, it is necessary to dissipate the heat thus evolved. For this purpose the tank or drum 6 is provided with a shell or jacket 22 which, with the external periphery of the drum, forms means for heating and cooling the drum. In order to effect a proper circulation of the heating and cooling fluids, the periphery of the drum 6 is provided with a helical rib 24. Grooves 25 in the rib 24 provide for the better distribution of the heating and cooling fluids. Steam may be used as the heating fluid. This is introduced through the channels 26 formed by the rib 24 by the inlet pipes 27 located at the top of the apparatus. The condensed steam is drawn off through the pipes 28 located at the bottom of the apparatus. The heads 7 and 8 of the apparatus are of jacketed construction to provide the chambers 30 and 31 into which the pipes 32 and 33 respectively admit steam for heating purposes. The condensed steam from the chambers 30 and 31 is drawn off through the pipes 34 and 35 respectively. The cooling fluid may be air intimately mixed with atomized water. This mixture is introduced through the channels 26 by means of a series of pipes 37 arranged tangentially in the jacket 22. The cooling fluid and air which have been converted into a mixture of superheated steam are discharged through the pipes 27. Low pressure steam mixed with cooled air may also be used as the cooling fluid. These cooling fluids on coming in contact with the hot surface of the drum will, of course, be instantly converted into steam and the cooling effect is due to the latent heat which is evolved while converting the water into steam. Care must be exercised that the steam generated in this manner is not sufficient to burst the jacket. By means of this cooling arrangement the operation of the apparatus may be made continuous. Unless the cooling means is effective, it is necessary to interrupt the operation of the apparatus, so that the length of time necessary to accomplish the desired chemical reaction is unduly prolonged.

During the process of converting the caustic soda and carbon monoxide into sodium formate, the particles of caustic soda and the gas must be intimately mixed. For this purpose the apparatus is provided with a new form of mixer. The mixer is so constructed that the means for agitating the material to be acted upon are arranged to move in close proximity to the interior sides of the drum. This is so as to maintain the middle part of the interior of the drum as free from obstructions as possible so as to prevent the mass acted upon from adhering to the agitating means. By arranging the agitating means near the inner surfaces of the interior of the drum, the material falls from the agitating means toward the middle of the drum and so is properly mixed or agitated. There will, of course, be a small amount of material adhering to the means for supporting the agitating means. This mixer comprises a series of knives or scrapers 39 arranged in staggered relation on angle irons 40 secured at the outer ends of the arms 41 of spiders 42 mounted on a shaft 43 journaled in the heads 7 and 8. Stuffing boxes 44 and 45 are provided to prevent the escape of gases from the reaction chamber 5. There may be any number of arms 41, but it has been found that four is a convenient number. The knives or scrapers 39 are arranged to move in close proximity with the interior surface of the drum 6. This arrangement keeps the interior surface of the drum clean. In like manner and for the same purpose the arms of the spiders 42 are provided with knives or scrapers 47 which move in close proximity with the interior surfaces of the heads 7 and 8. The scrapers 39 and 47 are made adjustable. It will be noted that by means of the mixer, constructed as described above, the whole interior surface of the drum is kept clean, which is a highly desirable thing in accomplishing certain chemical reactions. Moreover, the mounting of the spiders for supporting the scrapers is such as to leave practically the whole length of the shaft 43 smooth and unobstructed. This conduces to preventing caustic soda from building up on the shaft. It will be recognized that where a series of spiders are mounted throughout the length of the shaft, that the material acted upon accumulates and interferes with the desired chemical reactions. The mixer of the present invention has been produced to offer a minimum surface for the accumulation of the materials being mixed. It has been found in practice that this form of mixer operates most efficiently.

The caustic soda, when placed in the apparatus, as above indicated, is in powdered form. For some unknown reason, there is a stage during the process of converting the caustic soda and carbon monoxide into sodium formate at which the mass becomes more or less plastic and sticky. For this reason it is necessary to have the interior of the drum as free as possible from obstructions and to keep the interior surface of the drum clean. This plastic condition of the mass demands a strong construction to keep it in movement. After this stage of the process has passed, the mass again becomes pulverulent. When the process is completed the sodium formate is removed from the drum through the trap 49 provided with the hinged cover 50.

As before pointed out, the apparatus of the present invention has been described in connection with the production of sodium formate by the Hempel process. It will be recognized, however, from the above description, that the apparatus is adapted for use in effecting many kinds of chemical reactions in which pressure and heat are employed and in which it is necessary either to maintain the heat or to vary it from time to time throughout the process. It will be further understood that the invention is not to be restricted to the precise form shown in the drawings and described above, but that it may be embodied in other forms within the scope of the following claims.

Having thus described the invention, what is claimed as new is:—

1. An apparatus for use in effecting chemical reactions comprising a drum for containing the material to be acted upon, mixing means for agitating the material, means for conducting gases to the drum, means for conducting away the waste gases, means for heating the drum so as to promote reactions and means for cooling the drum so as to prevent it from rising above the predetermined temperature.

2. An apparatus for use in effecting chemical reactions comprising a jacketed cylindrical drum, jacketed heads at the ends of the drum, a shaft supported in the heads, spiders mounted on the shaft at each end of the drum, scrapers supported in staggered relation from the spiders to keep the interior inside surface of the drum clean, means for adjusting the scrapers, a relatively large inlet for admitting gases to the interior of the drum, a plurality of relatively small outlets for conducting away the used gases, means for heating the drum to promote chemical reaction therein, and means for cooling the drum to prevent it from rising above a predetermined temperature.

3. An apparatus for use in effecting chemical reactions comprising a drum for containing the material to be acted upon, a helical rib formed on the exterior of the drum, a casing resting on the rib thereby forming a helical chamber between the casing and the exterior of the drum, means for admitting heating fluids to the chamber, means for conducting away the used fluids, and grooves in the rib to facilitate the passage of the fluids through the chamber.

4. An apparatus for use in effecting chemical reactions comprising a jacketed cylindrical drum for containing the material to be acted upon, jacketed heads at the ends of the drum, a shaft journaled in the heads, scrapers supported from the shaft for keeping the entire inside surface of the drum clean, an inlet for admitting gases to the drum and an outlet for conducting away the used gases, a helical rib formed on the drum, a casing resting on the rib, thereby forming a helical chamber between the casing and the drum, means for admitting fluid to the chamber, means for conducting away the used fluids, and grooves in the periphery of the rib for facilitating the passage of the fluids through the chamber.

HERMAN W. PAULUS.